(12) United States Patent
Takakura et al.

(10) Patent No.: US 6,192,303 B1
(45) Date of Patent: Feb. 20, 2001

(54) VEHICLE DIAGNOSING APPARATUS

(75) Inventors: Keiji Takakura, Saitama-ken; Hiroyuki Aiba, Tochigi-ken, both of (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/020,844

(22) Filed: Feb. 9, 1998

(30) Foreign Application Priority Data

| Mar. 7, 1997 | (JP) | ................................. 9-053410 |
| Mar. 19, 1997 | (JP) | ................................. 9-066189 |

(51) Int. Cl.⁷ .......................... G01M 17/00; G06F 19/00
(52) U.S. Cl. ................... 701/33; 701/1; 701/29; 701/35
(58) Field of Search .................. 701/1, 29, 33, 701/35

(56) References Cited

U.S. PATENT DOCUMENTS

| 5,396,422 | 3/1995 | Forchert et al. . | |
| 5,473,540 | * 12/1995 | Schmitz | ................................. 701/35 |
| 5,758,300 | * 5/1998 | Abe | ........................................ 701/35 |
| 5,781,125 | * 7/1998 | Godau et al. | ........................... 701/33 |
| 5,781,871 | * 7/1998 | Mezger et al. | .......................... 701/33 |
| 5,884,202 | * 3/1999 | Arjomand | ............................... 701/35 |

FOREIGN PATENT DOCUMENTS

| 0 685 723 A2 | 5/1995 | (EP) . |
| 2 088 569 | 6/1982 | (GB) . |
| 2 290 631 | 3/1996 | (GB) . |
| 54-158530 | 12/1979 | (JP) . |
| 2-241853 | 9/1990 | (JP) . |
| 7-52141 | 6/1995 | (JP) . |
| 7-76724 | 8/1995 | (JP) . |
| 8-15095 | 1/1996 | (JP) . |

* cited by examiner

*Primary Examiner*—William A. Cuchlinski, Jr.
*Assistant Examiner*—Ronnie Mancho
(74) *Attorney, Agent, or Firm*—Armstrong, Westerman, Hattori, McLeland, & Naughton

(57) ABSTRACT

A portable diagnosing unit is connected to an electronic control unit (ECU) which is mounted on a vehicle. The diagnosing of the vehicle is performed by the portable diagnosing unit via the ECU according to the diagnosing program corresponding to the kind of ECU. The diagnosing data are transmitted to the host computer for processing. In this vehicle diagnosing apparatus, a diagnosing program for each kind of ECU is stored in the host computer. A diagnosing program corresponding to that kind of ECU which is read out by the portable diagnosing unit is transmitted from the host computer to the portable diagnosing unit. When the kind of ECU of the preceding vehicle is the same as the kind of ECU of the succeeding vehicle, the diagnosing program that was earlier received by the portable diagnosing unit which is connected to the ECU of the preceding vehicle is transmitted from that portable diagnosing unit to the portable diagnosing unit which is connected to the ECU of the succeeding vehicle.

3 Claims, 5 Drawing Sheets

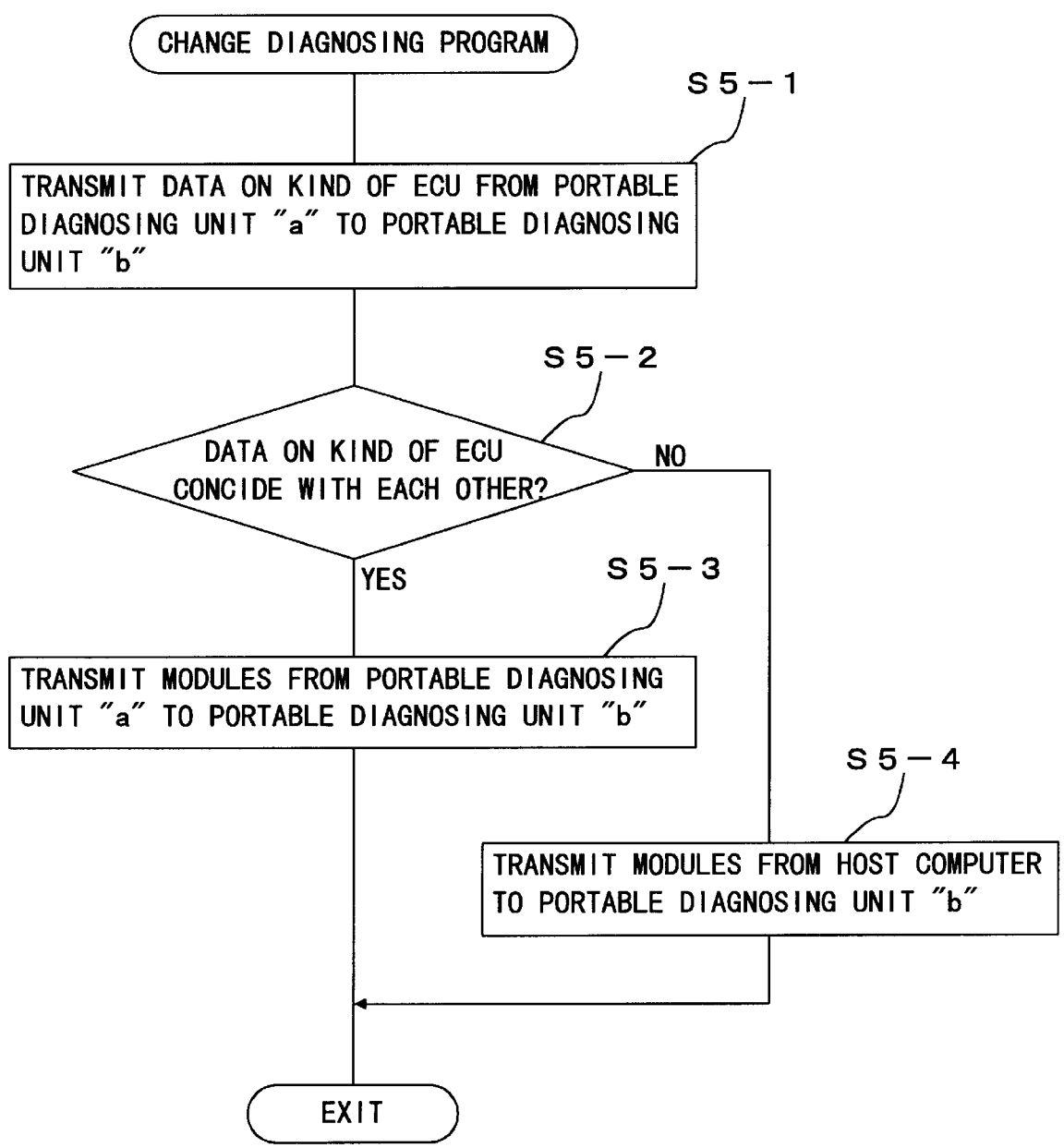

VEHICLE DIAGNOSING APPARATUS

BACKGROUND OF THE INVENTION

1. Field of the Invention

The present invention relates to a vehicle diagnosing apparatus which diagnoses a vehicle via an electronic control unit (ECU) mounted on the vehicle by using a portable diagnosing unit which is connected to the electronic control unit.

2. Description of the Related Art

As this kind of vehicle diagnosing apparatus, there has hitherto been known, in the Published Unexamined Japanese Patent Application No. 15095/1996, an apparatus comprising a host computer which wirelessly communicates with a portable diagnosing unit. The data obtained as a result of diagnosing (hereinafter called diagnosing data) of the vehicle are transmitted to the host computer to thereby perform such a processing of the data as the totalization, control, etc.

In the diagnosing apparatus of this prior art, diagnosing programs which have been prepared exclusively to suit each kind (or type) of electronic control unit are contained inside different read-only memory (ROM) cartridges. Each of the ROM cartridges is detachably mounted on the portable diagnosing unit. When the kind of the electronic control unit is changed, the ROM cartridge is replaced to another one to cope with the change in the kind of the electronic control unit.

Further, in Published Examined Japanese Patent Application No. 76724/1995, there is known the following. Namely, diagnosing programs which have been prepared exclusively to suit each kind of portable diagnosing unit are all contained in a memory portion (or a memory module) of the portable diagnosing unit. When the portable diagnosing unit is connected to the electronic control unit, the data on the kind of the electric control unit are read out to thereby call up a diagnosing program which corresponds to the data on the kind of the electronic control unit.

If the diagnosing programs are all contained in the memory portion of the portable diagnosing unit as in the above-described latter example of the conventional art, a large capacity is required in the memory portion. As a result, the portable diagnosing unit becomes large in size and the ease with which the portable diagnosing unit can be carried is impaired.

On the other hand, if the ROM cartridges are used as in the former example of the conventional art, a large memory is not required. However, with the increase in the number of kinds of the electronic control units, the number of the ROM cartridges correspondingly increases. As a result, their control becomes troublesome and the selection of the ROM cartridges must be done by the operator himself. There is, therefore, a possibility that the wrong ROM cartridge is selected, resulting in a failure in diagnosing.

In view of the above-described points, the present invention has an object of providing a vehicle diagnosing apparatus which can cope with the change in kind of the electronic control unit without using ROM cartridges and without impairing the ease with which the portable diagnosing unit can be carried.

SUMMARY OF THE INVENTION

In order to attain the above and other objects, the present invention is a vehicle diagnosing apparatus comprising: a portable diagnosing unit which is connected to an electronic control unit mounted on a vehicle; and a host computer which wirelessly communicates with the portable diagnosing unit such that the vehicle is diagnosed by the portable diagnosing unit via the electronic control unit according to a diagnosing program corresponding to the kind of electronic control unit and that diagnosing data are transmitted from the portable diagnosing unit to the host computer for processing the diagnosing data therein. The diagnosing apparatus is characterized in: that the host computer comprises a memory means for storing therein a diagnosing program of each kind of electronic control unit; and that a diagnosing program corresponding to those data on the kind of electronic control unit which are read by the portable diagnosing unit connected to the electronic control unit of the vehicle is transmitted from the host computer to the portable diagnosing unit.

According to the present invention, the diagnosing program corresponding to the kind of electronic control unit is transmitted from the host computer to the portable diagnosing unit. Therefore, there is no need of providing the portable diagnosing unit with a memory portion of a large capacity. As a result, the ease with which the portable diagnosing unit can be carried is not impaired.

The diagnosing program is prepared by combining plural kinds of diagnosing function programs, which are the constituting elements of the diagnosing program, corresponding to the kind of electronic control unit. Many of the diagnosing function programs can be used in common with each other even if the kinds of electronic control units are different. Therefore, preferably, flag data which determine the combination of the diagnosing function programs are prepared for each kind of electronic control unit. These flag data and the various kinds of diagnosing function programs are stored in memory. A diagnosing program is then prepared at any arbitrary time by calling up those plural kinds of required diagnosing function programs which are designated by the flag data, out of the various kinds of diagnosing function programs. Then, it is not necessary to store in memory the common diagnosing function programs, as constituting elements, in each of the diagnosing programs for respective kinds of electronic control units. In addition, since the flag data are far smaller in size than the diagnosing function program, the entire memory capacity remains to be small.

In this case, the following arrangement is conceivable. Namely, each kind of diagnosing function program and flag data prepared for each kind of electronic control unit are contained in the memory means of the host computer. The flag data corresponding to the kind of electronic control unit are selected by the host computer, and the diagnosing function programs which are designated by the flag data are called up to thereby prepare a diagnosing program. This diagnosing program is then transmitted to the portable diagnosing unit. This arrangement, however, requires a long time for one round of transmission. It is, therefore, preferable to make the following arrangement. Namely, the memory means of the host computer contains therein various kinds of diagnosing function programs which are constituent elements of the diagnosing program, and the portable diagnosing unit further comprises a memory means for storing therein flag data which determine the combination of diagnosing function programs and which are prepared for each kind of electronic control unit. Diagnosing function programs which are designated by the flag data corresponding to the data on the kind of electronic control unit are transmitted as the diagnosing program from the host computer to the portable diagnosing unit. By employing the above-described arrangement, the time for one round of communication becomes advantageously short. Even if the flag data of each kind of electronic control unit are stored in the memory means of the portable diagnosing unit, the memory capacity remains to be small, and the ease with which the potable diagnosing unit can be transported is not impaired.

There is a case in which a plurality of portable diagnosing units are provided and each of the portable diagnosing units is sequentially connected to the electronic control unit of each vehicle which is transported in sequence to thereby perform diagnosing. In this case, if the diagnosing program is transmitted from the host computer to each of the portable diagnosing units, there will occur an occasion in which the host computer must simultaneously perform both the receiving of the diagnosing data from any one of the portable diagnosing units and the transmission of the diagnosing program to another portable diagnosing unit. In practice, while the diagnosing data are being received, the transmission of the diagnosing program must be suspended. As a result, it takes much time to complete the transmission of the diagnosing program to all of the portable diagnosing units. It therefore becomes impossible to smoothly cope with the change in the kind of electronic control unit.

It is, therefore, preferable to make the following arrangement. Namely, when those data on the kind of electronic control unit which are read by a portable diagnosing unit connected to an electronic control unit of a preceding vehicle coincide with those data on the kind of electronic control unit which are read by a portable diagnosing unit connected to an electronic control unit of a succeeding vehicle, a diagnosing program received by the portable diagnosing unit connected to the electronic control unit of the preceding vehicle is transmitted from the portable diagnosing unit connected to the electronic control unit of the preceding vehicle to the portable diagnosing unit connected to the electronic control unit of the succeeding vehicle. According to this arrangement, at the time when the kind of electronic control unit is changed, once the diagnosing program is transmitted from the host computer to the portable diagnosing unit which is connected to the electronic control unit of the front endmost vehicle, the diagnosing program is thereafter sequentially transferred, by the communication between each of the portable diagnosing units, to each of the portable diagnosing units. Therefore, the diagnosing program will be transmitted to all the portable diagnosing units while the host computer is operating exclusively to receive the diagnosing data. It is thus possible to smoothly cope with the change in the kind of electronic control unit. In case the flag data on each kind of electronic control unit are stored, as described above, in the memory means of the portable diagnosing unit, the diagnosing function programs are transferred by the communication among the portable diagnosing units.

In order to enable to confirm the diagnosing results of each vehicle at a later time, it is preferable to provide the vehicle diagnosing apparatus with a means for reading the vehicle number which is attached to each vehicle and which is peculiar to each thereof. The read out data on the vehicle number and the vehicle diagnosing data are then stored in the host computer by co-relating them together. Here, if the data on the vehicle number and the diagnosing data from the portable diagnosing unit are separately transmitted to the host computer, there is a possibility that the data on the vehicle number and the diagnosing data deviate from each other if there are a plurality of portable diagnosing units. On the other hand, those read out data on the vehicle number are once stored in the portable diagnosing unit and, after the diagnosing has been completed, the data on the vehicle number are transmitted to the host computer together with the diagnosing data and the data on the kind of the electronic control unit, there is advantageously no possibility that the diagnosing data and the data on the kind of the electronic control unit deviate from each other.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 5 is a flow chart to show the procedure of changing the diagnosing program.

DETAILED DESCRIPTION OF PREFERRED EMBODIMENTS

Figure 1:
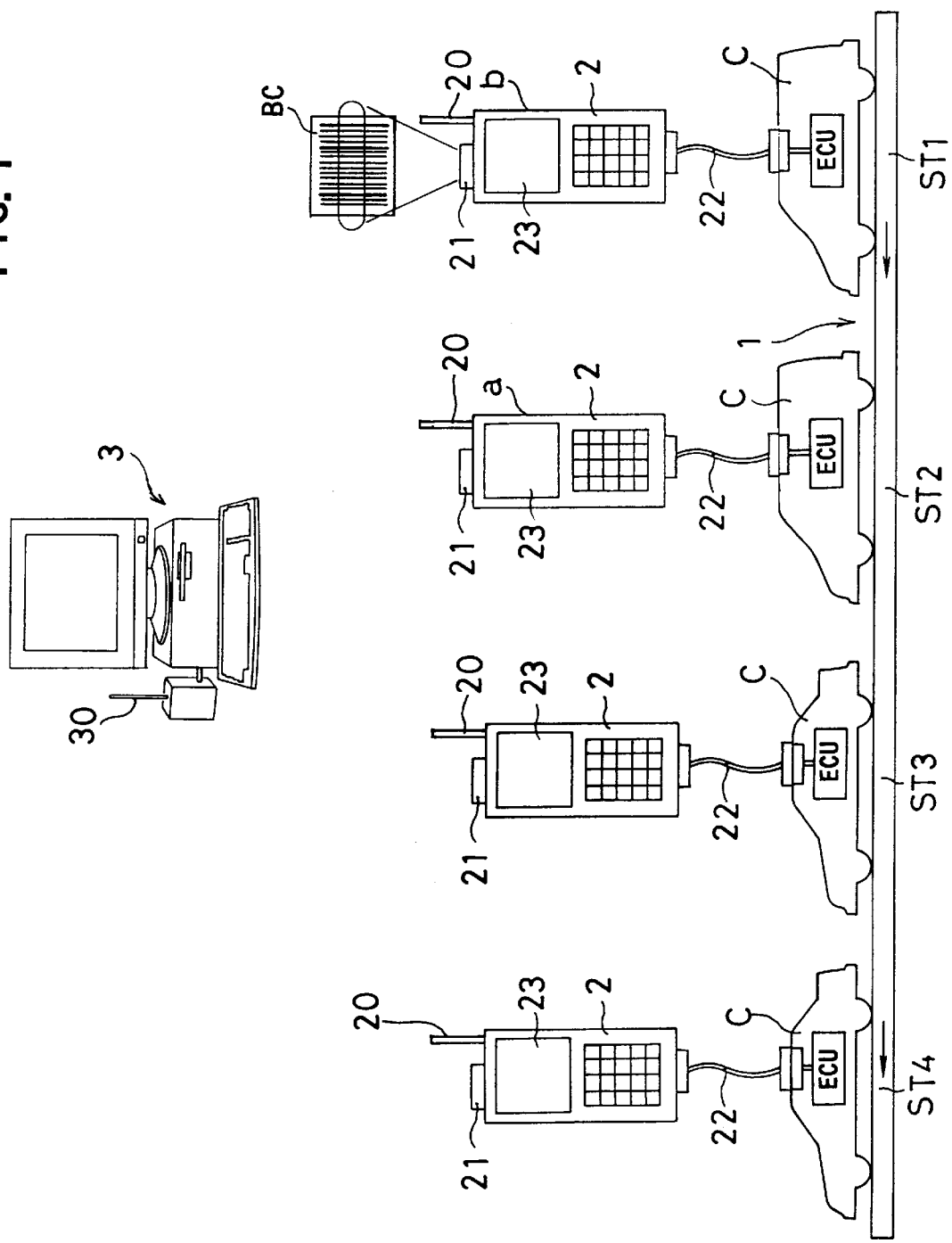
FIG. 1 is a schematic diagram to show an overall arrangement of one example of the vehicle diagnosing apparatus of the present invention.

With reference to FIG. 1, reference numeral 1 denotes a vehicle diagnosing line on which vehicles are diagnosed. Vehicles C each having mounted thereon an electronic control unit (ECU) are sequentially transported from a first station ST1 to a fourth station ST4, via a second station ST2 and a third station ST3.

This vehicle diagnosing line 1 is provided with auxiliary equipment in the form of a plurality of portable diagnosing units 2 and a host computer 3. Each of the portable diagnosing units 2 is provided with an antenna 20. By connecting another antenna 30 to the host computer 3, it is made possible to wirelessly communicate bidirectionally between each of the portable diagnosing units 2 and the host computer 3. It is also made possible to wirelessly communicate bidirectionally between respective portable diagnosing units 2. Further, each of the portable diagnosing units 2 is provided with a bar code reader 21 for reading a bar code BC which represents a peculiar vehicle number given to each of the vehicles.

Figure 2:
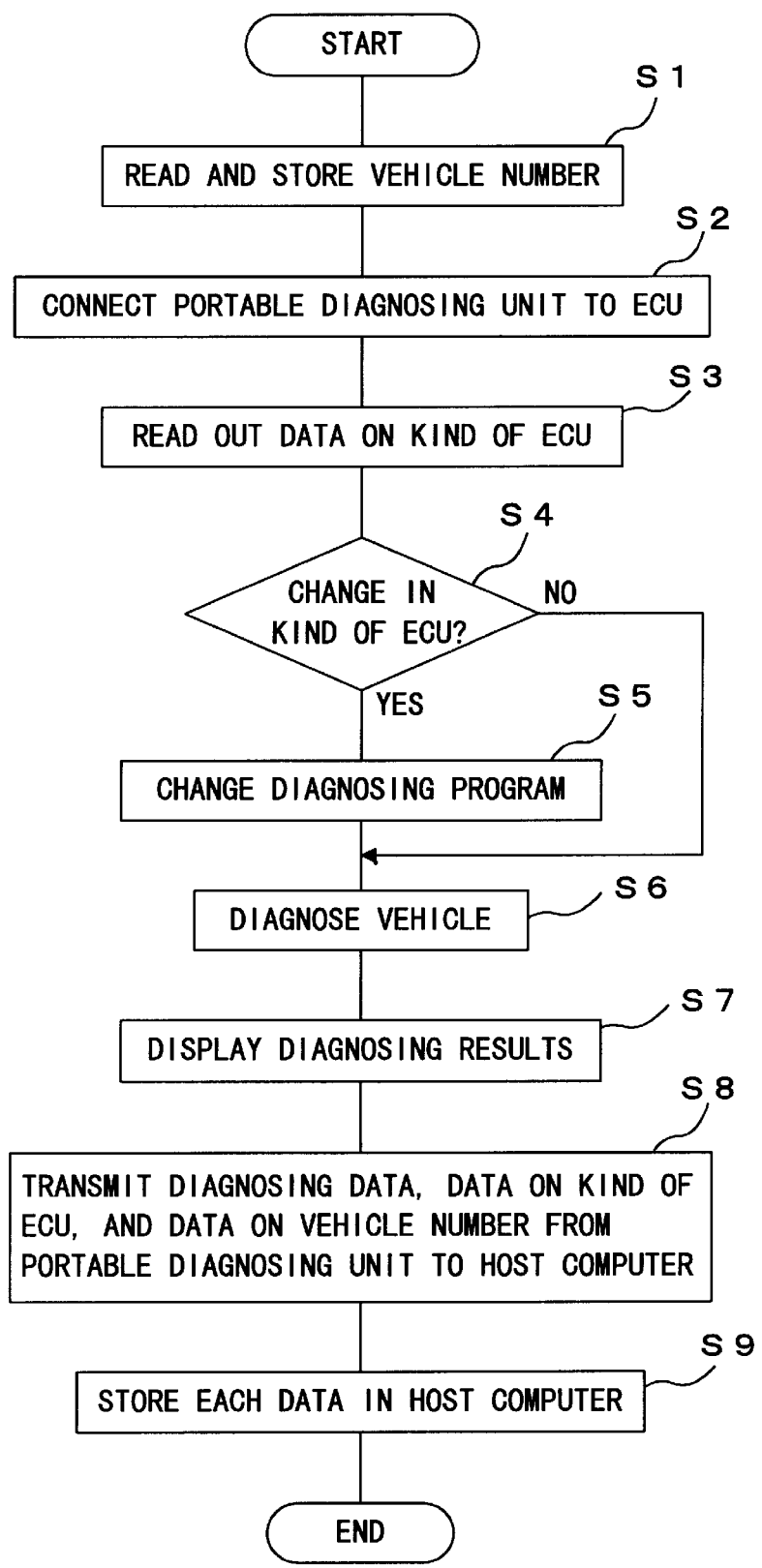
FIG. 2 is a flow chart to show the diagnosing procedure.

The procedure for diagnosing the vehicle is shown in FIG. 2. First, in the first station ST1, the bar code BC is read by the bar code reader 21, and the data on the vehicle number are stored in the portable diagnosing unit 2 (S1). This portable diagnosing unit 2 is connected to the electronic control unit of the vehicle C via a cable 22 (S2). Then, the portable diagnosing unit 2 reads out those data on the kind of the electronic control unit which have been stored therein to thereby discriminate the kind of the vehicle (S3). If the kind of the electronic control unit to which the portable diagnosing unit 2 has been connected this time is different from the kind of the electronic control unit to which the diagnosing unit 2 was connected last time (S4), the diagnosing program which is used for diagnosing the vehicle is changed to the one which corresponds to the kind of the electronic control unit to which the diagnosing unit 2 has been connected this time (S5). Then, while the vehicle C is transported from the second station ST2 to the fourth station ST4, the diagnosing of the vehicle C is performed by the portable diagnosing unit 2 via the electronic control unit according to the diagnosing program (S6). Thereafter, in the fourth station ST4, the results of diagnosing are displayed in a display portion 23 of the portable diagnosing unit 2 (S7). The diagnosing data which are the results of diagnosing the vehicle C and the data on the kind of the electronic control unit are transmitted from the portable diagnosing unit 2 to the host computer 3 together with the data on the vehicle number (S8). The diagnosing data, the data on the kind of the electronic control unit, and the data on the vehicle number are stored in the host computer 3 by co-relating them together (S9).

Figure 3:
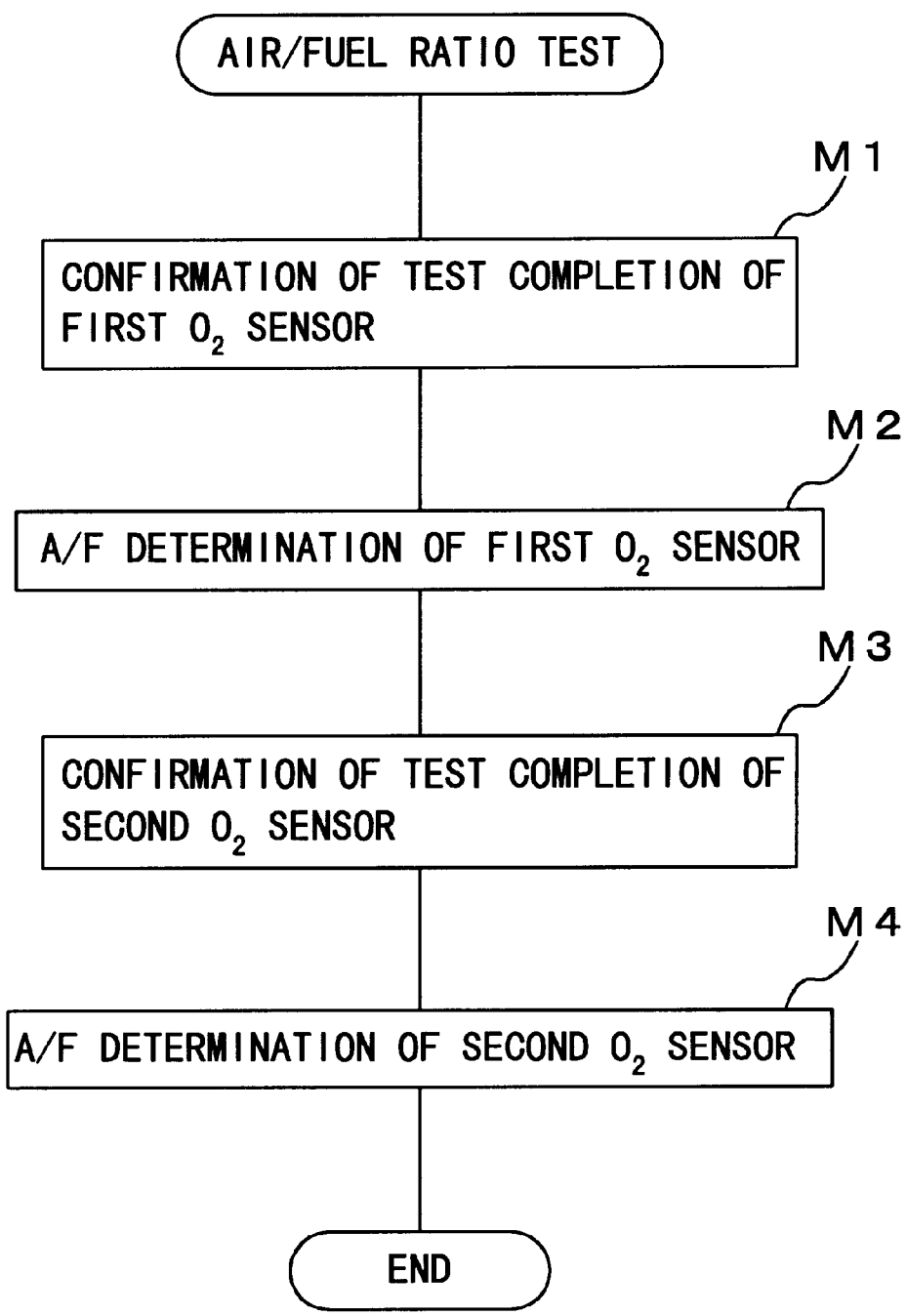
FIG. 3 is a flow chart to show the diagnosing program of an air/fuel ratio test.

The diagnosing of the vehicle is performed with reference to a large number of items such as a vehicle speed sensor test, an idling test, an $O_2$ sensor test, an air/fuel ratio test, or the like. A diagnosing program for the air/fuel ratio test which is one of the diagnosing items is shown in FIG. 3. This diagnosing program is intended for use with the kind of vehicle having mounted thereon two $O_2$ sensors for measuring the oxygen concentration in the exhaust gas, i.e., a first $O_2$ sensor and a second $O_2$ sensor. After having confirmed that the testing of the first $O_2$ sensor has been completed (M1), a determination (or judgement) on the air/fuel ratio (A/F determination) is made by using the first $O_2$ sensor (M2). Then, after having confirmed that the testing of the second $O_2$ sensor has been completed (M3), a determination on the air/fuel ratio (A/F determination) is made by using the second $O_2$ sensor (M4). The diagnosing program for the air/fuel ratio in the kind of vehicle in which only the first $O_2$ sensor is mounted thereon is constituted by M1 and M2. In this manner, among diagnosing function programs M1 through M4 which are constituting elements of the diagnosing program, M1 and M2 are diagnosing function programs which are common to the kind of vehicle having mounted thereon two $O_2$ sensors and the kind of vehicle having mounted thereon only one $O_2$ sensor.

For each kind of electronic control unit, flag data to determine the combination of the diagnosing function programs are prepared. Diagnosing function programs which are designated by the flag data are then called up and are combined together, whereby a diagnosing program which suits the kind of electronic control unit is prepared at an arbitrary time. In this arrangement, the memory capacity remains to be small as compared with an example in which there must be stored both the diagnosing program made up of M1 through M4 for the kind of vehicle having mounted thereon two $O_2$ sensors and the diagnosing program made up of M1 and M2 for the kind of vehicle having mounted thereon only one $O_2$ sensor.

In this case, the following arrangement is also conceivable. Namely, various diagnosing function programs and flag data prepared for each kind of electronic control unit are stored in a memory means provided in the host computer 3. At the time when the kind of electronic control unit is changed, a diagnosing program is prepared by the host computer 3 according to the flag data which correspond to the kind of electronic control unit. This diagnosing program is then transmitted from the host computer 3 to the portable diagnosing unit 2. In this arrangement, however, much time is required before the transmission of the diagnosing program is completed. During that period, the host computer cannot receive the diagnosing data, resulting in a loss of time.

Figure 4:
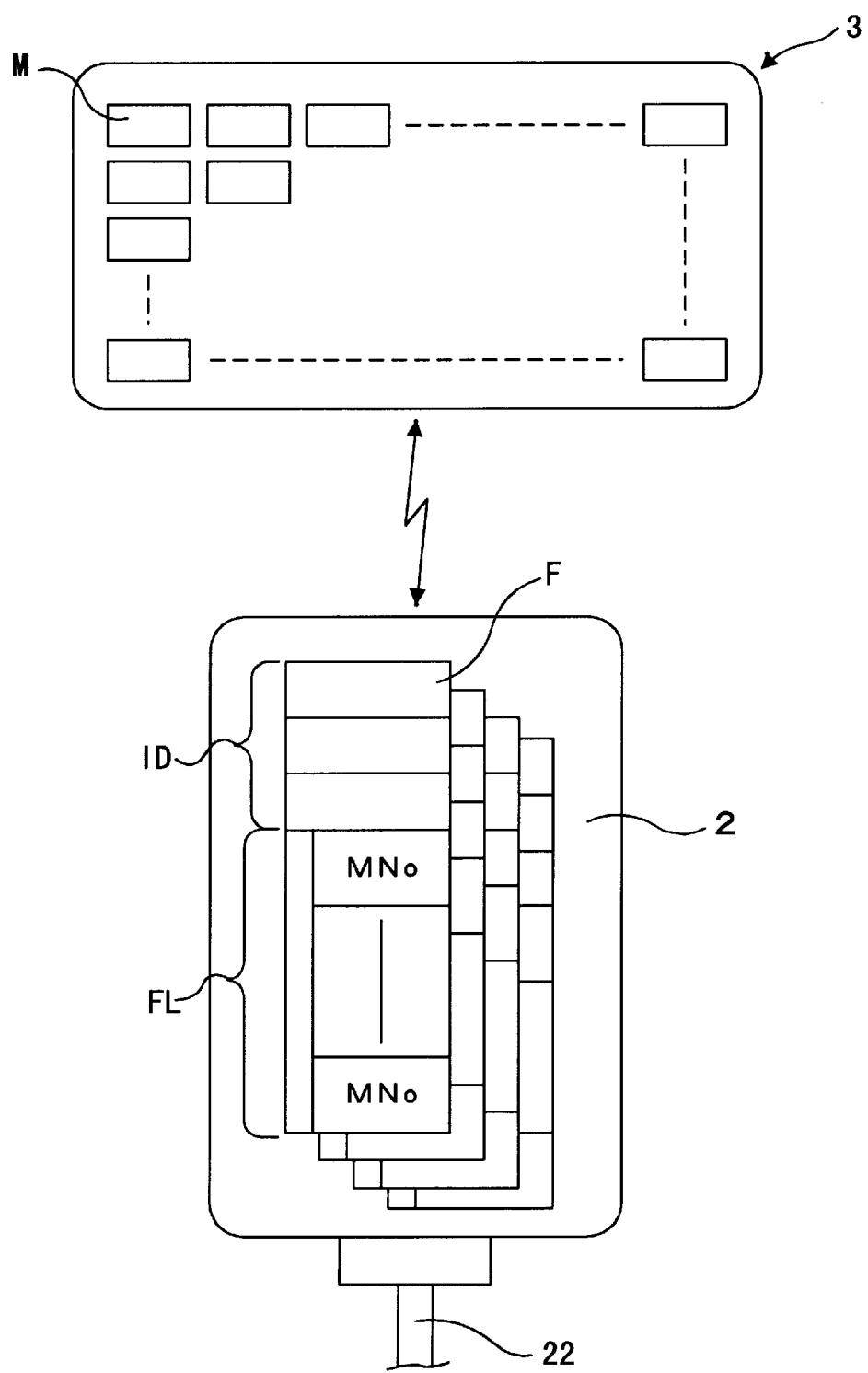
FIG. 4 is a schematic diagram to show the content of memory in the host computer and the content of memory in the portable diagnosing unit.

As a solution, in the embodiment of the present invention, the following arrangement is employed as shown in FIG. 4. Namely, various diagnosing function programs such as M1 through M4 are stored in the form of modules M in the memory means which is provided in the host computer 3. The flag data F prepared for each kind of electronic control unit are stored in a memory means provided in the portable diagnosing unit 2. The flag data F are made up of a portion ID in which are described bibliographic matters such as reference numbers, kinds of corresponding electronic control units, or the like, and a flag portion FL which defines how and in what order the modules M should be performed. In the flag portion FL there is described the number $MN_0$ of the modules M, which are stored in the host computer 3, in the order in which the modules M are performed. For example, if the diagnosing relates to the air/fuel ratio shown in FIG. 3, the number $MN_0$ is described in the order of M1, M2, M3 and M4.

At the time when the kind of electronic control unit is changed, the flag data F which correspond to the kind of electronic control unit are selected by the portable diagnosing unit 2. The modules M of the numbers $MN_0$ that are designated by the flag data F are transmitted from the host computer 3 to the portable diagnosing unit 2, whereby a diagnosing program is prepared according to the flag data F. In this manner, the processing to be performed by the host computer 3 at the time when the kind of electronic control unit is changed is only the transmission of the modules M. The time during which the data cannot be received, therefore, becomes shorter with little or no time loss.

FIG. 1 shows a condition in which the front endmost vehicle C that is different in kind from the preceding ones is in the second station ST2. While this vehicle C is still in the first station ST1, the modules M are transmitted, as described above, from the host computer 3 to the portable diagnosing unit 2 which is connected to the electronic control unit of this vehicle C. It is conceivable to transmit the modules M also from the host computer 3 to the next (or succeeding) portable diagnosing unit 2 which is connected to the electronic control unit of the succeeding vehicle C that is transported to the first station ST1. However, when the time of receiving by the host computer 3 of the diagnosing data is overlapped with the time of transmitting the modules M, one of the receiving and transmitting must be suspended until the other of the receiving and transmitting has been completed. This results in a time loss.

As a solution, in the embodiment of the present invention, the following arrangement is made. Namely, after the portable diagnosing unit 2 marked as b in FIG. 1 is connected to the electronic control unit in the first station ST1, when a judgement is made in step S4 in FIG. 2 that the kind of electronic control unit has been changed, whereby the program proceeds to step S5, a command for transmitting the data on the kind of electronic control unit is first sent, as shown in FIG. 5, to the portable diagnosing unit 2 which is marked as "a" in FIG. 1 and which is connected to the electronic control unit of the preceding vehicle. The data on the kind of electronic control unit of the preceding vehicle are then transmitted from the portable diagnosing unit 2 marked as "a" to the portable diagnosing unit 2 marked as b (S5-1). A discrimination is made whether these data on the kind of the electronic control unit and the data on the kind of electronic control unit as read by the portable diagnosing unit 2 marked as b coincide with each other (S5-2). If they coincide with each other, a command for transmission of the modules is sent to the portable diagnosing unit 2 marked as "a." The modules M that have earlier been received by the portable diagnosing unit 2 marked as "a" are thus transmitted from the portable diagnosing unit 2 marked as "a" to the portable diagnosing unit 2 marked as b (S5-3). Only when the data on the kind of electronic control unit do not coincide with each other, a command for transmission of the modules is sent to the host computer 3 so that the modules M can be transmitted from the host computer 3 to the portable diagnosing unit 2 marked as b (S5-4). According to the above-described arrangement, as long as a vehicle that is the same in kind with the preceding vehicle is transported to the first station ST1, the modules M are transferred in a sequential order from each of the portable diagnosing units which are connected to the electronic control unit of each of the preceding vehicles to each of the portable diagnosing units which are connected to the electronic control unit of each of the succeeding vehicles. It means that the host computer 3 operates exclusively to receive the diagnosing data. Therefore, there occurs no time loss due to the overlapping of the timing for receiving the diagnosing data and the timing for transmitting the modules M by the host computer 3.

In case the flag data F are not stored in each of the portable diagnosing units 2, the diagnosing program itself is transmitted from the portable diagnosing unit that is connected to the electronic control unit of the preceding vehicle to the portable diagnosing unit that is connected to the electronic control unit of the succeeding vehicle.

In the above-described embodiment, each of the portable diagnosing units 2 is provided with a bar code reader 21. However, it may also be so arranged that a bar code reader is disposed in, e.g., the second station ST2 and that the data on the vehicle number read out by the bar code reader are transmitted to the portable diagnosing unit 2 to store the data therein.

It is readily apparent that the above-described vehicle diagnosing apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicle diagnosing apparatus comprising:

a portable diagnosing unit which is connected to an electronic control unit mounted on a vehicle; and a host computer which wirelessly communicates with said portable diagnosing unit such that the vehicle is diagnosed by said portable diagnosing unit via said electronic control unit according to a diagnosing program corresponding to the kind of electronic control unit and that diagnosing data are transmitted from said portable diagnosing unit to said host computer for processing the diagnosing data therein;

characterized in:

that said host computer comprises a memory means for storing therein a diagnosing program of each kind of electronic control unit; and that a diagnosing program corresponding to those data on the kind of electronic control unit which are read by said portable diagnosing unit connected to said electronic control unit of the vehicle is transmitted from said host computer to said portable diagnosing unit;

wherein said portable diagnosing unit is provided in a plurality of units; and wherein, when those data on the kind of electronic control unit which are read by a portable diagnosing unit connected to an electronic control unit of a proceeding vehicle coincide with those data on the kind of electronic control unit which are read by a portable diagnosing unit connected to an electronic control unit of a succeeding vehicle, a diagnosing program received by said portable diagnosing unit connected to said electronic control unit of the preceding vehicle is transmitted from said portable diagnosing unit of the preceding vehicle to said portable diagnosing unit connected to said electronic control unit of the succeeding vehicle.

2. A vehicle diagnosing apparatus comprising:

a portable diagnosing unit which is connected to an electronic control unit mounted on a vehicle; and a host computer which wirelessly communicates with said portable diagnosing unit such that the vehicle is diagnosed by said portable diagnosing unit via said electronic control unit according to a diagnosing program corresponding to the kind of electronic control unit and that diagnosing data are transmitted from said portable diagnosing unit to said host computer for processing the diagnosing data therein;

characterized in:

that said host computer comprises a memory means for storing therein a diagnosing program of each kind of electronic control unit; and that a diagnosing program corresponding to those data on the kind of electronic control unit which are read by said portable diagnosing unit connected to said electronic control unit of the vehicle is transmitted from said host computer to said portable diagnosing unit;

wherein said memory means of said host computer contains therein various kinds of diagnosing function programs which are constituent elements of said diagnosing program;

said portable diagnosing unit further comprises a memory means for storing therein flag data which determine a combination of diagnosing function programs and which are prepared for each kind of electronic control unit;

wherein diagnosing function programs which are designated by the flag data corresponding to the data on the kind of electronic control unit are transmitted as said diagnosing program from said host computer to said portable diagnosing unit;

wherein said portable diagnosing unit is provided in a plurality of units; and wherein, when those data on the kind of electronic control unit which are read by a portable diagnosing unit connected to an electronic control unit of a preceding vehicle coincide with those data on the kind of electronic control unit which are read by a portable diagnosing unit connected to an electronic control unit of a succeeding vehicle, diagnosing function programs received by said portable diagnosing unit connected to said electronic control unit of the preceding vehicle are transmitted from said portable diagnosing unit connected to said electronic control unit of the preceding vehicle to said portable diagnosing unit connected to said electronic control unit of the succeeding vehicle.

3. A vehicle diagnosing apparatus according to claims 1 or 2, further comprising a means for reading a vehicle number which is attached to each of the vehicles and which is peculiar to each thereof, wherein those read out data on the vehicle number are once stored in said portable diagnosing unit and, after the diagnosing has been completed, the data on the vehicle number are transmitted to said host computer together with the diagnosing data and the data on the kind of said electronic control unit.

* * * * *